(12) United States Patent
Chao

(10) Patent No.: US 10,778,835 B2
(45) Date of Patent: Sep. 15, 2020

(54) INFERRING USER CONTEXT VIA TIME-SERIES CORRELATION ANALYSIS

(71) Applicant: Piksel, Inc., Wilmington, DE (US)

(72) Inventor: Gerald CheShun Chao, Los Angeles, CA (US)

(73) Assignee: PIKSEL, INC., Wilmington, DE (US)

(*) Notice: Subject to any disclaimer, the term of this patent is extended or adjusted under 35 U.S.C. 154(b) by 0 days.

(21) Appl. No.: 15/764,646

(22) PCT Filed: Sep. 30, 2016

(86) PCT No.: PCT/EP2016/073514
§ 371 (c)(1),
(2) Date: Mar. 29, 2018

(87) PCT Pub. No.: WO2017/055607
PCT Pub. Date: Apr. 6, 2017

(65) Prior Publication Data
US 2018/0288219 A1    Oct. 4, 2018

Related U.S. Application Data

(60) Provisional application No. 62/234,980, filed on Sep. 30, 2015.

(51) Int. Cl.
| | |
|---|---|
| *H04H 60/33* | (2008.01) |
| *H04M 1/725* | (2006.01) |
| *H04H 60/39* | (2008.01) |
| *H04N 21/41* | (2011.01) |
| *H04H 60/32* | (2008.01) |

(52) U.S. Cl.
CPC ........ *H04M 1/72586* (2013.01); *H04H 60/33* (2013.01); *H04H 60/39* (2013.01); *H04N 21/4126* (2013.01); *H04H 60/32* (2013.01)

(58) Field of Classification Search
CPC .................................................. H04N 21/4126
See application file for complete search history.

(56) References Cited

U.S. PATENT DOCUMENTS

| | | | |
|---|---|---|---|
| 2009/0077579 A1* | 3/2009 | Li | G06Q 30/02 725/34 |
| 2010/0131443 A1* | 5/2010 | Agarwal | G06F 17/30867 706/46 |
| 2013/0014136 A1* | 1/2013 | Bhatia | H04N 21/252 725/9 |

OTHER PUBLICATIONS

International Search Report and Written Opinion, European Patent Office, dated Jan. 2, 2017.

* cited by examiner

*Primary Examiner* — Yassin Alata
(74) *Attorney, Agent, or Firm* — Holzer Patel Drennan

(57) ABSTRACT

There is disclosed a technique of associating device activity to a broadcast programme, comprising: receiving a model for a broadcast programme identifying portions of content and portions of breaks in the content; monitoring, via a client software module running on users' mobile devices, said device's active or inactive states; receiving an activity stream of a user device; comparing the activity stream to the model of the broadcast programme to identify a correlation between them; inferring a user of the user device as watching the broadcast programme based on a level of the correlation.

20 Claims, 5 Drawing Sheets

INFERRING USER CONTEXT VIA TIME-SERIES CORRELATION ANALYSIS

FIELD OF THE INVENTION

The present invention relates to the detection of TV viewers, and more specifically, a non-intrusive method to infer if a mobile device user is watching TV and what show the user is likely watching.

BACKGROUND

With the advent of mobile computing, mobile devices have become an integral part of many people's daily lives. It has also created a new behavior during TV viewing, whereby viewers would be using their mobile devices at the same time as watching television (TV). This new behavior can potentially have great implications for the TV industry, since it can transform TV from a one-way broadcast medium into a two-way interactive medium. That is, while the TV can be used for displaying the broadcast content, the mobile devices can be used for interactivity corresponding to the broadcast.

However, due to various factors, currently there is no method to communicate between televisions and mobile devices without the users actively enabling this. Because of this requirement, in majority of the situations the mobile device does not know what the TV is displaying, and the TV does not know what the mobile device is showing. Without this connection in place, the mobile devices cannot be used for TV interactivity, since they are simply standalone devices that happen to be in the same room as the TV.

There is prior art that aim to address this issue, most notably via audio fingerprinting technologies to listen to the TV audio on the mobile device in order to identify what content is being shown on the TV. While this approach can work technically, it requires TV viewers to actively turn on the microphone on their mobile devices for the audio identification. This can be done manually by the user, which can be laborious, or done automatically by listening via the microphone continuously, which is intrusive and can raise privacy concerns since all conversations would be captured.

An alternative is for the mobile device to directly connect to the television or the set-top box over a communications network in order to find out what the TV is showing. This approach is not practical due to the sheer number of different TVs and set-top boxes that people may have, and this path excludes any TVs and devices that do not have networking capabilities, which is still the dominant majority. Another challenge to these approaches is that they require the TV viewers to launch specific applications on their mobile devices in order to connect with their TVs, which is a tall order since mobile devices are used for a multitude of functionalities, such as email, browsing, games, chats, etc.

Therefore, a need exists for a better way to identify when a user of a mobile device might be watching television, and do so in a manner that is non-intrusive and transparent to the users, yet reasonably accurate.

Various prior art arrangements are discussed in the following U.S. prior art documents.

U.S. Pat. No. 5,801,747—describes a method for creating viewer profiles via categories aggregated over programs consumed, using metadata descriptors of the programs. However, it requires knowledge of the exact shows being watched for the profiles to be created and updated.

U.S. Pat. No. 6,530,082—describes a method for accompanying TV broadcasts with interactive content designed for viewers to consume alongside the broadcast. By capturing the actions taken by the viewers with respect to the interactive portion, this prior art is able to compile viewership data about the broadcasts. There are three assumptions this prior art needs, one is the creation of the interactive content that's usually manually created, two is that the content is engaging enough to get sufficient numbers of viewers to interact with, and three the viewers would not object to their interactions being tracked. Therefore, this prior is quite complex in the method for which viewership data is collected.

U.S. Pat. No. 7,039,928—describes a method for the direct collection of TV viewership data by internet-connected TV devices to report the shows the TVs are showing. This prior art assumes that the TVs need to be connected to the Internet, and that the viewers are willing to have their TVs track their precise consumption patterns.

U.S. Pat. No. 7,260,823—describes a method for monitoring a TV watching session, and looking for highest correlation to existing session profiles of the same device to guess which of the individuals within the same household was the viewer. The intended use of this prior art is for the identification of individual viewers, and it requires direct tracking of interactions with the TV devices that the viewers may not be comfortable with.

U.S. Pat. No. 7,627,872—describes a method for the identification of media usage via a combination of server and client-side system for monitoring media, and the captured data is reported back to server-side for viewership data collection. This prior art requires viewers' permission and participation for collecting their TV consumption habits in order for the viewership data to be collected and therefore is quite intrusive.

U.S. Pat. No. 8,108,888—describes a method for capturing audio samples of TV broadcasts to determine what shows are being consumed. It requires viewers' approval and participation for recording and monitoring their TV viewing behaviors and therefore is quite intrusive.

U.S. Pat. No. 8,180,712—describes a method for inferring the on/off state of a TV by sending two signatures of each state to a viewer-side monitoring device. The monitoring devices captures audio samples from the viewer's environment and compare the samples to the two signatures to infer either the on or off state of the viewer's TV. This prior requires the capturing of audio samples of the viewers' environment, and is intrusive and therefore requires viewers' approval due to privacy concerns.

U.S. Pat. No. 8,495,680—describes a method for grouping, or clustering, of TV viewers based on behavioral history in order to customize their TV experience. It requires knowledge of TV consumption history of the viewers, as well as pre-selecting demographic groups to aggregate behavioral history. Therefore, it is not well suited for novel and time-sensitive groupings, and it also requires detailed tracking of TV viewers and therefore intrusive.

U.S. Pat. No. 8,578,403—describes a method for audience measurement via polling of the viewers and aggregating the response to estimate audience sizes. This method is approximate and requires recruiting viewers to participate in sufficient numbers to improve the accuracy of the viewership data.

U.S. Pat. No. 8,600,797—describes a method for inferring demographic data like household income of social network users based on making inference of these demographic attributes for users missing these attributes via similarity to other users who the demographic attributes are known. This prior art can only infer pre-determined attributes where data exists for associating users with these attributes. Therefore, it is not well suited for inferring novel and time-sensitive attributes.

U.S. Pat. No. 8,838,522—describes a method for identifying anonymous users to predetermined user groups based on similarity of behavior patterns of known users. Therefore, this prior art requires a cohort of know users, as well as data from these known users' behavior patterns in order for it can infer anonymous users into predetermined user groups.

US20100203876—describes a method for inferring demographic categories based on conditional probabilities of users belonging to predetermined categories. This method requires training data to compute conditional probabilities, and cannot infer novel and time-sensitive categories.

SUMMARY OF THE INVENTION

In one aspect the invention provides a method of associating device activity to a broadcast programme, comprising: receiving a model for a broadcast programme identifying portions of content and portions of breaks in the content; monitoring, via a client software module running on users' mobile devices, said device's active or inactive states; receiving an activity stream of a user device; comparing the activity stream to the model of the broadcast programme to identify a correlation between them; inferring a user of the user device as watching the broadcast programme based on a level of the correlation.

The model may be a user behaviour model further comprising updating the user behaviour model in dependence on the comparing step.

The comparing step may compare activity indicated in the activity stream with the periods of content and periods of break in the model. A high activity during the break periods and a low activity during the content period may infer that the user is watching the programme.

The method may further comprise determining if the user is watching broadcast content, the comparing step being enabled in dependence on. Determining if the user is watching broadcast content may comprise one or more of: collecting a user device's locked status; collecting a user device's screen interaction status; collecting a user device's motion activity status; collecting a user device's screen power status; collecting a user device's processor unit state; collecting a user device's batter drain status; and collecting a user device's active application states.

The method may further comprise: storing a usage pattern and time stamps of a mobile device; aligning historical usage pattern data based on similar time frames; normalizing current usage pattern data via aligned historical usage pattern data; and utilizing the normalized pattern as the activity stream of the user in the comparing step.

The may further comprise restricting the results of the comparing step to popular broadcast programmes or broadcast programmes for which the user has an affinity.

The method may further comprising notifying the inferred broadcast programme to the user, and receiving notification as to whether the inference is correct.

The invention also provides a programme playback device comprising: a receiver for receiving a model of a programme, the model identifying a portion of content and a portion of break; a receiver for receiving an activity stream of a user device; a comparator for correlating the activity stream with the model; and a module for inferring engagement of a user of the user device with the programme in dependence on the correlation output.

The model may be a user behaviour model, the device further being configured to update the user behaviour model in dependence on the comparing step.

The device may be configured to compare activity indicated in the activity stream with the periods of content and periods of break in the model. The device may be configured to infer from a high activity during the break periods and a low activity during the content period that the user is watching the programme.

The device may be further configured to watch broadcast content, and enable a comparison in dependence on. The device may be configured to determine if the user is watching broadcast content in dependence on one or more of: collecting a user device's locked status; collecting a user device's screen interaction status; collecting a user device's motion activity status; collecting a user device's screen power status; collecting a user device's processor unit state; collecting a user device's batter drain status; and collecting a user device's active application states.

The may further comprise a store for storing a usage pattern and time stamps of a mobile device, and configured to: align historical usage pattern data based on similar time frames; normalize current usage pattern data via aligned historical usage pattern data; and utilize the normalized pattern as the activity stream of the user in the comparing step.

The device may be further configured to restrict the results of the comparing step to popular broadcast programmes or broadcast programmes for which the user has an affinity.

The device may further be configured to notify the inferred broadcast programme to the user, and receiving notification as to whether the inference is correct.

The present invention describes a system for deducing whether a user of a mobile device is also watching live TV broadcasts, and if so, further deducing which TV show the user is watching. The invention does so by passively observing the usage pattern of the mobile device over time, and correlating the usage pattern with time series of events of a television program aggregated across its viewers. When a strong correlation is detected, the present invention can then infer that the mobile user is also watching that television program. In doing so, the present invention removes the need for TV viewers to change their behavior on the mobile devices while watching TV, yet enable the mobile devices to infer whether the users are watching which TV shows and respond accordingly.

The present invention is based upon the observation that TV viewing behavior of live programming has a predictable pattern, in that certain viewer activities are loosely correlated to TV programming and commercials. For example, it has been observed that water demand surges when commercial breaks occur during Super Bowls in the U.S., or a similar surge in electricity demand in the U.K. when the country's most popular TV show ends and viewers turn on their electric kettles to make tea en masse. These are example of co-routines that viewers partake while watching TV, and with mobile devices becoming another common co-routine, their usage is often time-correlated with a program's events such as its start, end, and during commercial breaks. That is, the higher the correlation between when a user is actively using her mobile devices and when a show is on commercial breaks, and inversely minimal or no activity when the show is on, then the higher the likelihood that user is watching that show. Similarly, if a viewer is active at similar time points as other viewers of a particular program, such as updating social media during exciting moments of a sports game, then one can infer that the viewer is watching the same game.

This correlation of co-routines may not be strong enough on its own to infer which TV show a mobile device user is watching, since there is a large number of TV shows and shows may share similar programming schedules. Similarly, a single mobile device user may not have consistent behaviors with respect to their TV watching co-routines, and therefore this correlation signal can be weak and noisy. To mitigate this, the present invention provides multiple methods to improve the fidelity of the signal, as well as reduce the dimensionality of the search space in order to maximize the accuracy of the inference.

A first enhancement is to identify factors that would broadly indicate whether a mobile device is being used while watching TV. These factors include time of day, location, movement, local network or cellular network, type of device, and others, to rule out usage data when the device is active while not watching TV. This step ensures that only relevant data is used for the subsequent analysis.

A second enhancement is the normalization of the mobile device usage over time, since each device is usually used by single user, versus shared devices such as TVs and tablets. The per-device usage data is normalized with respect to time of day, day of the week, and seasonality of TV programming. This normalization is done by overlapping usage data over the same time frames of likely TV watching periods in order to create a baseline model of that mobile user's activity patterns. This step exploits the fact that TV watching is highly habitual, and for regular watchers of the same TV show, their consumption patterns would emerge over time by aggregating the data across all of the show's airings. Thus, when the present invention infers which show a user may be watching, the user's historical usage data during the same time period is used in addition to the live data the mobile device is detecting in order to better construct the usage pattern of a user during a particular TV show.

A third enhancement is in reducing the number of TV shows the present invention would look for potential matches, mainly as a way to reduce the likelihood of collisions in their programming schedules. That is, within the same time slot, there may be multiple show that have the same timing for commercial breaks. Therefore, these shows would correlate equally well to a user's usage pattern. One method is to choose the show that is most popular as a way to break ties, if such data is available. An alternative method is to compute affinity scores between the user to each TV show, and choose the highest scoring show to break ties. The benefit of the first method is its simplicity but is less accurate for viewers who do not tend to watch popular shows. The second method is more complex but potentially more accurate since the affinity scores are specific to the user.

The affinity scores are computed by an analysis of the user's consumption history, the simplest being the number of times that the user watched each show that matched. Another approach is to compute the similarity of each show that matched to the shows that user has watched in the past, and choose the most similar one as the best guess. This similarity can be computed using the metadata about each show, such as the genre and cast, as well as more complex analysis such as collaborative filtering and content similarity analysis.

A fourth enhancement is optional but highly advantageous, which is to aggregate the time series data across known TV viewers of individual shows. This data set, when in sufficient quantity per show, provides even better modeling of TV viewer behavior than the TV show's programming schedule, since it reflects actual watchers' co-routine behaviors. This data can be automatically inferred via the auto-correlation analysis of their behavior time series for ones surpassing a high level of confidence. This data can be further improved by either users confirming the TV show that they are watching via their mobile devices, or other means of expressing their preference for certain shows such as liking a show.

During the live inference phase of the present invention, a live time series is maintained and updated via a server-side component for each TV show currently broadcasting with its programming events, including its start, end, and commercial breaks. Additionally, the usage pattern from the show's known viewers are aggregated from their mobile devices to model the prototypical behavior of the show's viewers. Furthermore, if there is additional time-coded metadata about the show, such as scripts from movies, data feeds for sports events, or which characters or contestants are on screen, this data can be incorporated to model the likelihood of the viewers being engaged with the show or not.

These behavior models are maintained by the server-side component for each of the live TV shows being monitored, which consists of a time series of the likelihood of viewers of that show interacting with their mobile device. With these models, inference of which TV show a mobile device user may be watching become a simple process of computing the correlation of the user's usage pattern of their mobile device to each of the time series of the maintained behavior model across all viewers for each TV show. When a high correlation is found between the user's usage pattern with a TV show's behavior model, then an inference can be made that this user is watching that TV show.

A fifth enhancement is optional but is also the most accurate, which is to prompt the user of the mobile device for confirmation of inferences made on the TV show they may be watching. If users confirm the correct or incorrect inferences, such feedback is used to validate or invalidate the correlations between the time series data. Alternatively, if such prompting is impractical or deemed overly intrusive, more indirect methods such as polls or "liking" shows can be used to collect feedback data to confirm the accuracy of time series predictions.

DETAILED DESCRIPTION

Figure 1:
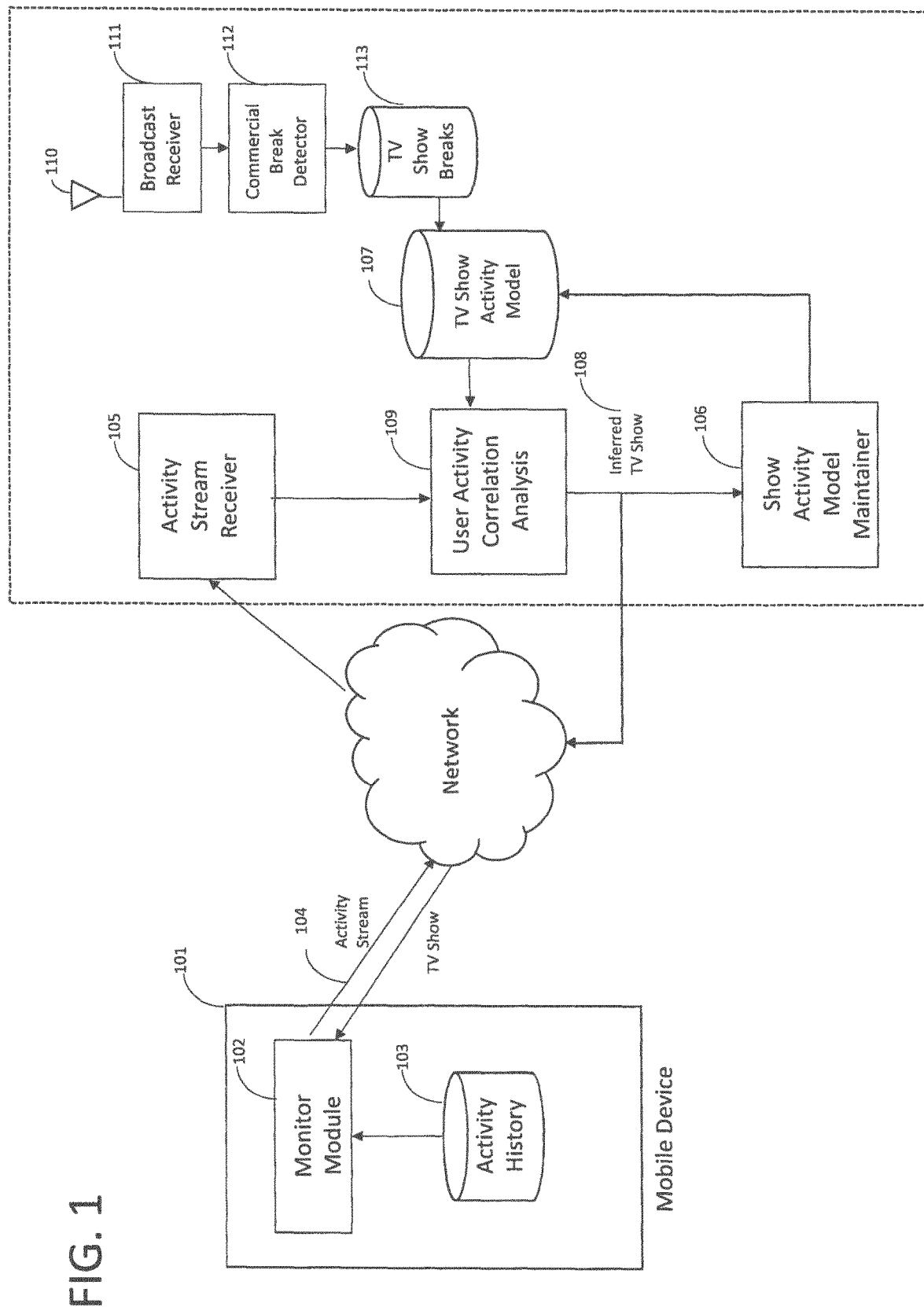
FIG. 1 illustrates in schematic form the manner in which information is collected on client devices and processed on the server side in accordance with an example according to the invention.

FIG. 1 illustrates in schematic form the manner in which information is processed in an example in accordance with the invention. As will be described in more detail below, some of the structures and functions illustrated in FIG. 1 represent optional functionality that need not be present in all implementations of the invention.

On a mobile device of an end user denoted by reference numeral 101, a client-side monitor module denoted by reference numeral 102 is installed and passively logs the active or inactive state of the device. Optionally, the mobile device can contain a local storage of historical time series denoted by reference numeral 103, which can be used for normalization of the latest time series of the device.

The mobile device provides an activity stream, denoted by reference numeral 104, to the network. This activity stream is periodically sent over a network to the server-side for further processing. The activity stream is a time series.

The server-side is responsible for maintaining the behavior models of TV shows currently airing, by collecting the activity time series across the client monitor modules 102 of all mobile devices. At the server side a receiver module denoted by reference numeral 105 is connected to the network, and receives the activity streams from the client modules. The activity stream receiver 105 then forwards them to a time series correlation analysis module denoted by reference numeral 109.

The time series correlation analysis module 109 takes as its input the activity time series of the activity streams, and tries to determine whether each time series has a strong enough correlation to one of the known TV shows being monitored. The user activity correlation analysis module 109 additionally receives inputs from a TV show behaviour model module 107, which provides models of TV programmes. If a strong correlation is found, the identified TV show can be returned to the client-side monitor module 102, if requested. Additionally, the time series for the show is sent to the show behavior model maintainer module denoted by reference numeral 106. As shown in FIG. 1 an inferred TV show is provided by the user activity correlation analysis to the show behaviour model maintainer 106 and is optionally transmitted to the network.

The task of the show model maintainer module 106 is to continually update the viewer behavior models for individual shows. These models are initialized by the commercial breaks of that show, which can either be provided by a metadata provider or by capturing video signals via broadcast receivers denoted by reference numeral 111, and analyze the video signals for commercial breaks via the commercial break detector denoted by reference numeral 112. TV show breaks may then be stored in a TV show breaks store 113. However, how the commercial breaks are determined is not central to the present invention, as long as this data is available near the time of the live broadcast, or with a small delay of minutes.

As actual user behavior data is inferred for a particular show by the correlation analysis module 109, the time series is added to the behavioral model of that show by weighted averaging across the time series accumulated for that show for all users, the weight being the confidence of the inference. This is done by the show behavior model maintainer module 106 and saved to the show behavior model database 107, which are then used for subsequent inference by the correlation analysis module 109.

The operation is now further described with reference to examples.

Figure 2:
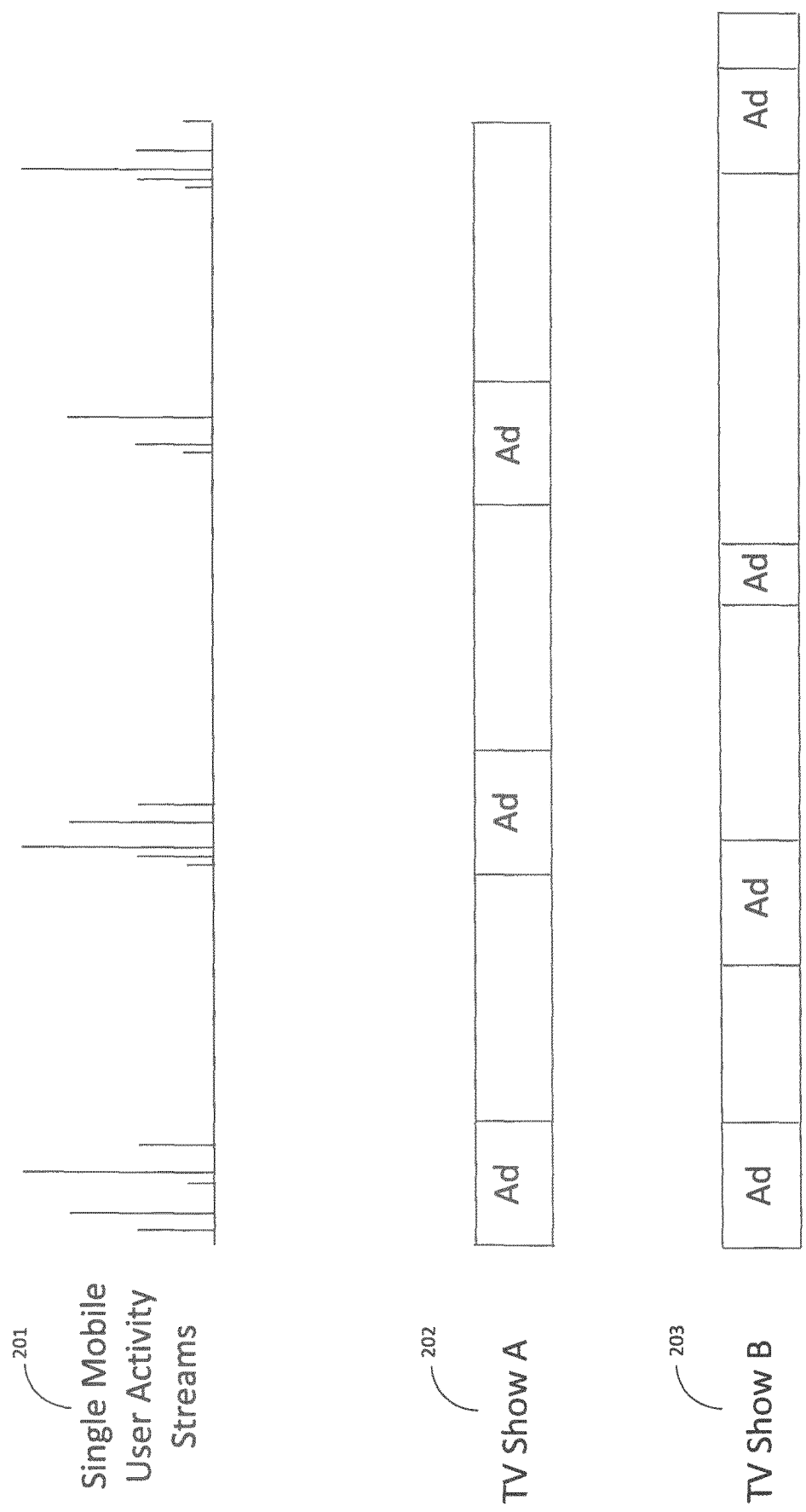
FIG. 2 illustrates in schematic form the manner in which a user's activity time series is correlated in accordance with an example according to the invention.

FIG. 2 illustrates in schematic form an exemplary manner in which a user's activity time series is correlated with two potential TV shows to find the likely show the user is viewing by the user activity correlation analysis module 109. The user's activities denoted by reference numeral 201 is drawn as a horizontal time line with spikes indicating activities on the user's mobile device. This may be the activity stream provided on line 104.

The time lines 202 and 203 of two TV shows are also shown, the time lines for each TV show denoting the times of the content and advert portions. The time lines 201, 202 and 203 are time-aligned.

In this ideal case, the user's time series perfectly correlates with the ad breaks of TV show A as denoted by reference numeral 202, and much less so than the ad breaks of TV show B as denoted by reference numeral 203. Therefore it is inferred that the user is watching Show A via this correlation analysis and not TV show B.

It can be seen that the correlation of mobile activity with ad breaks, and mobile inactivity with content, allows an inference that the user is watching a particular TV programme.

It will be understood that this can be extended for any number of TV programmes, and applied to any number of users.

A number of techniques may be provided to enhance the method.

A first optional enhancement is to identify factors that would broadly indicate whether a mobile device is being used while watching TV. These factors include time of day, location, movement, local network or cellular network, type of device, and others, to rule out usage data when the device is active while not watching TV. This step ensures that only relevant data is used for the subsequent analysis.

A second optional enhancement is the normalization of the mobile device usage over time, since each device is usually used by single user, versus shared devices such as TVs and tablets. The per-device usage data is normalized with respect to time of day, day of the week, and seasonality of TV programming.

Figure 3:
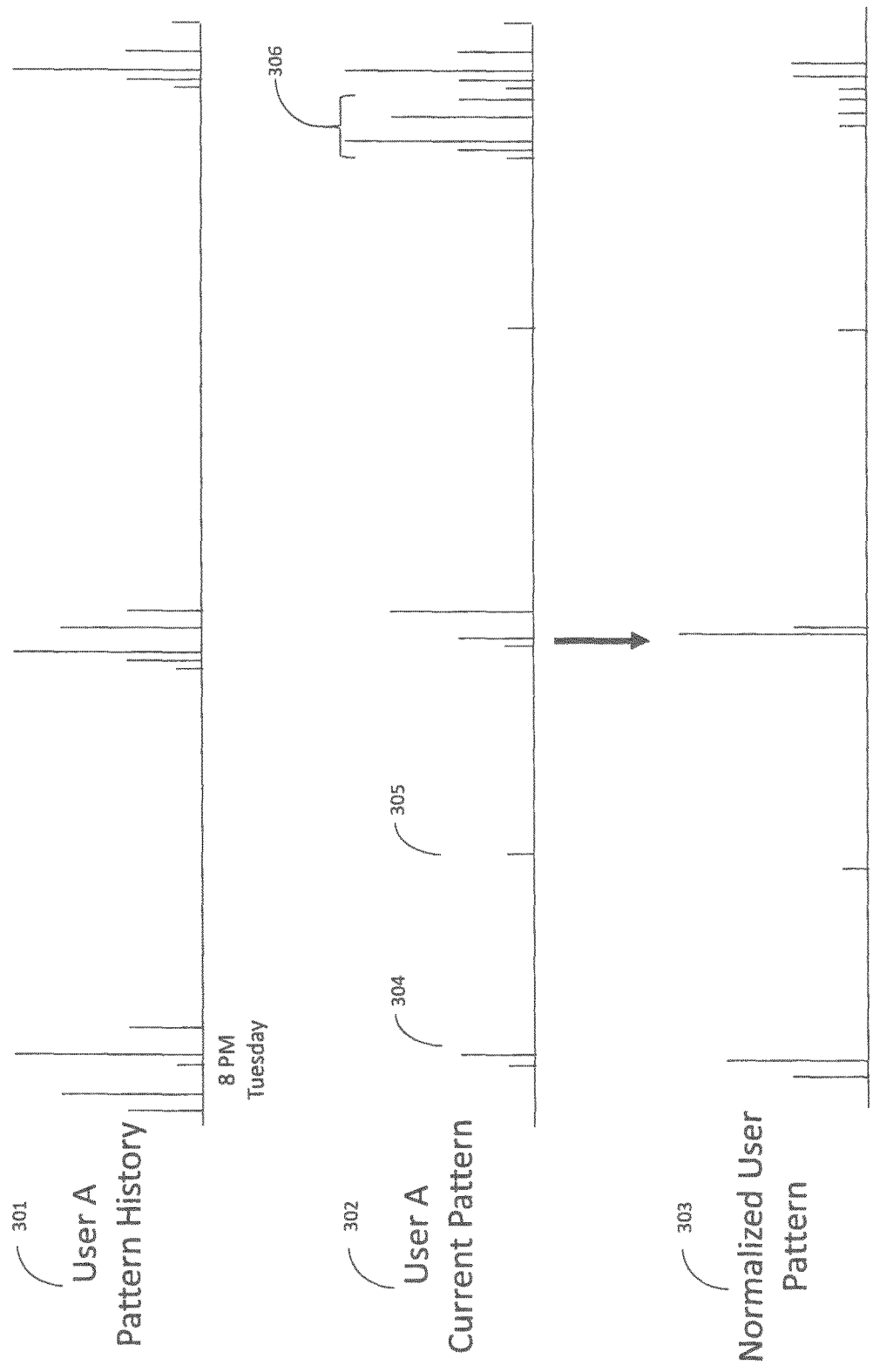
FIG. 3 illustrates in schematic form the manner in which a user's activity time series is normalized in accordance with an example according to the invention.

FIG. 3 illustrates in schematic form an exemplary manner in which a user's activity time series is normalized with respect to the historical time series within the same time period by the user activity correlation analysis module 109. These time series are again drawn as horizontal time lines, with spikes indicating activities on user's mobile device. Reference numeral 301 denotes the pattern history of user A, and reference numeral 302 denotes the pattern history of user A for a particular time of day (i.e. the current pattern of user A).

Reference numeral 303 denotes a normalized pattern for user A. This normalization takes the current time series of device activity denoted by reference numeral 302, and normalizes the activity level of this time series with the likelihood of the same user being active at the same time frames from his historical usage time series denoted by reference numeral 301. For example, if the current time frame is 8 PM to 8:30 PM on Tuesday, the likelihood of device activity is computed by weighted mean of all the time series from previous Tuesdays in the same time frames 301. The current time series 302 is then normalized via the historical time series 301, so weak activity signals denoted by reference numeral 304 can be amplified, while noisy activity signals as denoted by reference numerals 305 and 306 would be suppressed to result in a better time series of the user's device activities 303.

The purpose of generating the normalized user pattern 303 is to improve the correlation performed in FIG. 2, by using the normalized pattern 303 in place of the pattern 201. The normalized pattern may be created by overlapping usage data over the same time frames of likely TV watching periods in order to create a baseline model of that mobile user's activity patterns. This step exploits the fact that TV watching is highly habitual, and for regular watchers of the same TV show, their consumption patterns would emerge over time by aggregating the data across all of the show's airings. Thus, when the present invention infers which show a user may be watching, the user's historical usage data during the same time period is used in addition to the live data the mobile device is detecting in order to better construct the usage pattern of a user during a particular TV show.

The first and second enhancements are techniques to reduce noise in the incoming data.

A third optional enhancement is in reducing the number of TV shows the present invention would look at for potential matches, mainly as a way to reduce the likelihood of collisions in their programming schedules. That is, within the same time slot, there may be multiple show that have the same timing for commercial breaks. Therefore, these shows would correlate equally well to a user's usage pattern. One method is to choose the show that is most popular as a way to break ties, if such data is available. An alternative method is to compute affinity scores between the user to each TV show, and choose the highest scoring show to break ties. The benefit of the first method is its simplicity, but it is less accurate for viewers who do not tend to watch popular shows. The second method is more complex but potentially more accurate since the affinity scores are specific to the user.

The affinity scores are computed by an analysis of the user's consumption history, the simplest being the number of times that the user watched each show that matched. Another approach is to compute the similarity of each show that matched to the shows that user has watched in the past, and choose the most similar one as the best guess. This similarity can be computed using the metadata about each show, such as the genre and cast, as well as more complex analysis such as collaborative filtering and content similarity analysis.

It can be understood that when there is a long list of possible matches, e.g. due to weak correlation, then the popularity and/or user affinity may be used to improve matching accuracy. These enhancements may be provided as a post-filter of the matched candidates rather than a pre-filter, to avoid the case where the user is watching something less popular or outside their typical watching habits.

A fourth optional enhancement, which may be highly advantageous, is to aggregate the time series data across known TV viewers of individual shows. This data set, when in sufficient quantity per show, provides even better modeling of TV viewer behavior than the TV show's programming schedule, since it reflects actual watchers' co-routine behaviors. This data can be automatically inferred via the auto-correlation analysis of their behavior time series for ones surpassing a high level of confidence. This data can be further improved by either users confirming the TV show that they are watching via their mobile devices, or other means of expressing their preference for certain shows such as liking a show.

A primary mechanism for aggregating viewer data of the same show is simply based on the strength of the correlation to known programme breaks. An example may be the Super Bowl or Oscars, where when the ad breaks are shown, user's event streams that best correlate with these breaks are identified. Their events are aggregated to update the model of the user behaviour to these shows. In accordance with this enhancement, in addition a user may be asked to optionally confirm the show they are watching, to help improve the confidence of the user behaviour monitoring. This confirmation preferably relies on the correlation to infer a likely show the user may be watching, with confirmation then being optionally provided.

A fifth optional enhancement, which may also be the most accurate, is to prompt the user of the mobile device for confirmation of inferences made on the TV show they may be watching. If users confirm the correct or incorrect inferences, such feedback is used to validate or invalidate the correlations between the time series data. Alternatively, if such prompting is impractical or deemed overly intrusive, more indirect methods such as polls or "liking" shows can be used to collect feedback data to confirm the accuracy of time series predictions.

Figure 4:
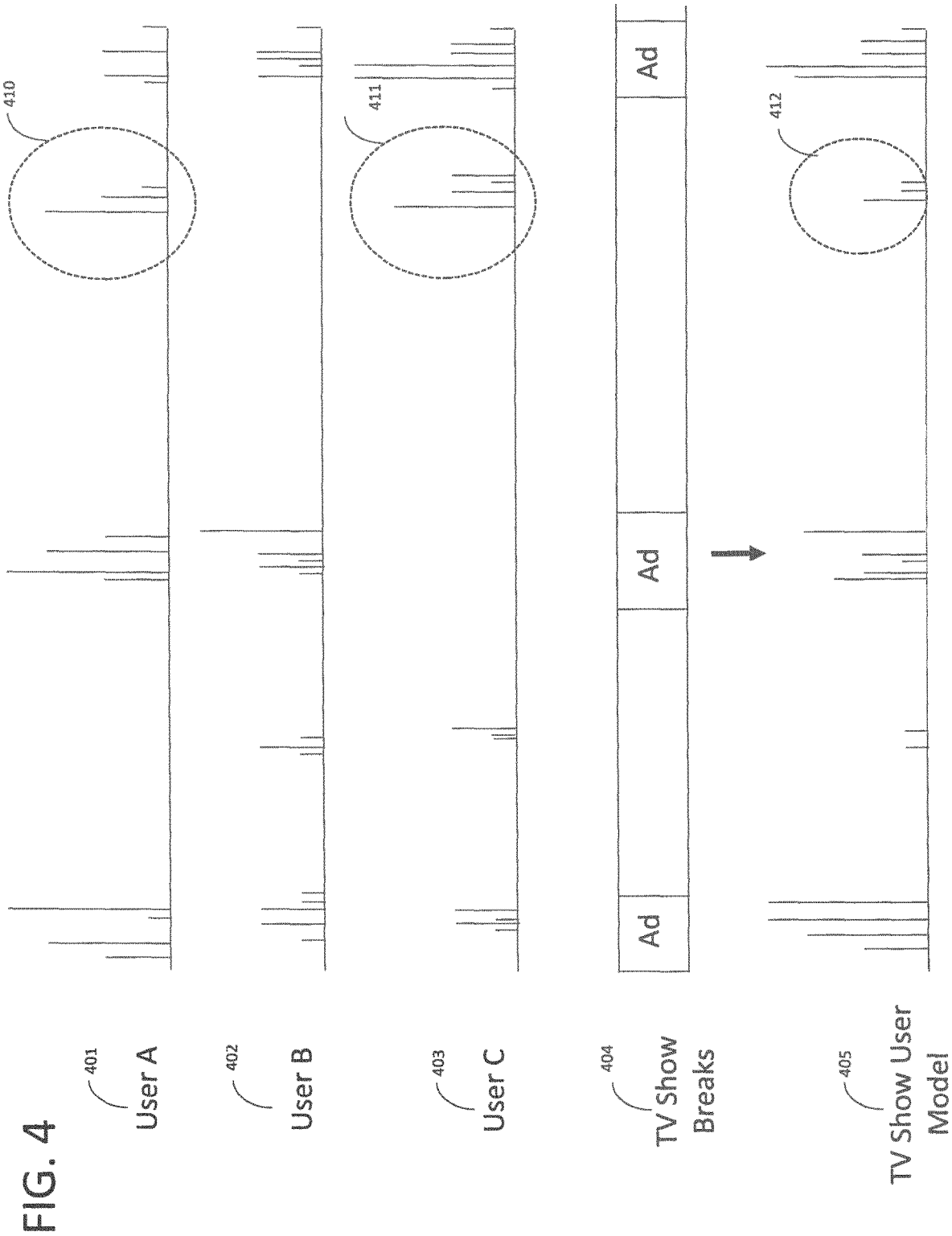
FIG. 4 illustrates in schematic form the manner in which multiple users' activity time series are correlated in accordance with an example according to the invention.

FIG. 4 illustrates in schematic form an exemplary manner in which multiple users' activity time series are correlated with the show's commercial breaks by the show behavior model maintainer 106. In this example, time series from three viewers of the same show are aligned by time as denoted by reference numerals 401, 402, and 403. These time series are aligned with a show's commercial breaks denoted by reference numeral 404, so the activity levels within the ad breaks are accumulated onto this show's user model denoted by reference numeral 405. In addition, towards the end of the show, User A and User C both exhibit some activities around the same time of the show as denoted by reference numerals 410 and 411, and such correlation may also be registered on the show's user behavior model denoted by reference numeral 412 as an additional modeling for this show's usage patterns.

In FIG. 4 all three users have been initially identified, by inference (using correlation analysis) to be viewers of the same programme, principally by correlation to the ad breaks. Once that inference has been made, FIG. 4 illustrates an enhancement in which activity patterns between users can be correlated, to find points in time where users may be active: e.g. tweeting during an exciting moment or chatting. This allows the system to improve the correlation between the shows user behaviour model with additional users that had previously weak correlations.

Figure 5:
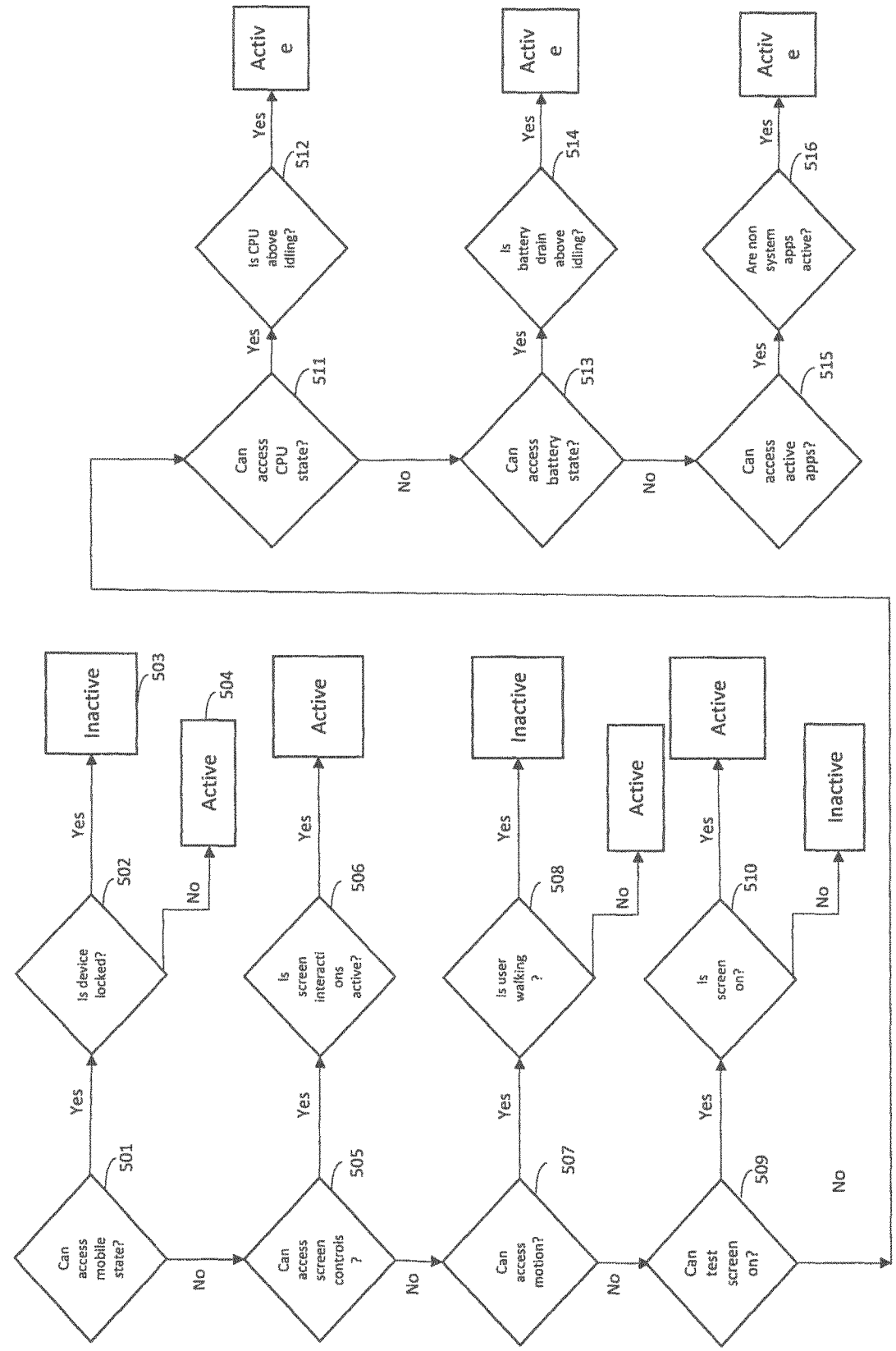
FIG. 5 is an exemplary flow chart which illustrates the manner in which the client-side monitoring module determines whether the device it is installed on is active or inactive.

FIG. 5 is an exemplary flow chart that illustrates the manner in which the client-side monitoring module 102 determines whether the device it is installed on is active or inactive. The module is designed to be minimally invasive so as to not need the user's explicit approval for the monitoring it performs. Instead, it infers where the user is actively using the device based on a series of tests into the device's state, by the order of decreasing confidence.

The process starts with checking whether the module is allowed to determine if the mobile device is locked, denoted by reference numeral 501. If yes, and if the device is locked as denoted by reference numeral 502, then the device's state is registered as inactive denoted by reference numeral 503, whereas if the device is unlocked, one can infer the user is active as denoted by reference numeral 504, or optionally perform more state tests.

If the device lock state is unavailable, the module can test whether it is allowed to access the user's interactions with the device's screen denoted by reference numeral 505, and if yes, and if the user is actively interacting with the screen denoted by reference numeral 506, then device's state is registered as active.

If the screen interaction status is not accessible, and if the module can access the device's motion data denoted by reference numeral 507, the motions of the user can be analyzed for their locomotion status denoted by reference numeral 508. If the device is not moving at all, then the module can register an inactive state. Conversely, if the user is not moving but the device senses subtle movements, then the module can register the device as active.

If the motion data is not accessible, and if the screen's on/off state is accessible denoted by reference numeral 509, then an off screen implies an inactive state denoted by reference numeral 510.

If the screen state is not accessible, and if the device's CPU state is accessible denoted by reference numeral 511, the module can compare the activity level of the CPU to when it is idling. If the CPU is above the idling level of utilization denoted by reference numeral 512, then the device state is active.

If the CPU state is not accessible, and if the battery drain rate of the device is accessible denoted by reference numeral 513, then the drain rate can be compared to when the device is idling denoted by reference numeral 514. If the drain rate is close to the idling rate, then the device state is inactive, and conversely, if the rate is above the idling rate, then the device state is active.

Lastly, if the battery drain rate is not accessible, and if the active application state can be accessed denoted by reference numeral 515, then the active application is queried. If the active application is not one of the default system applications that are normally active denoted by reference numeral 516, then the device state is active.

The invention has been described by way of example with reference to particular arrangements. Aspects of various arrangements may be combined in part or in whole. The invention is not limited to the details of any example given. The scope of the invention is defined by the appended claims.

The invention claimed is:

1. A method of associating device activity on a first device to a broadcast programme broadcast on a second device, the first device being different than the second device, the method comprising:
at the second device:
receiving the broadcast programme; and
displaying the broadcast programme;
at the first device:
monitoring, via a client software module running on the first device, an activity stream of one or both of the first device's active and inactive states; and
transmitting the activity stream from the first device;
at a server:
receiving the broadcast programme displayed on the second device;
generating a model for the broadcast programme;
identifying portions of content of the broadcast programme and portions of breaks in the content;
receiving the activity stream of the first device from the first device;
comparing the activity stream of the first device to the model for the broadcast programme and identifying a correlation between the activity stream and the model for the broadcast program; and
inferring a user of the first device as watching the broadcast programme on the second device based on a level of the correlation.

2. The method of claim 1, wherein the model is a user behaviour model, the method further comprising:
updating the user behaviour model in dependence on the comparing step.

3. The method of claim 1, wherein the comparing step compares activity indicated in the activity stream with periods of content and periods of break in the model.

4. The method of claim 3, wherein high activity during the break periods and minimal to no activity during the content periods infers that the user of the first device is watching the programme on the second device.

5. The method of claim 1, further comprising:
determining that the user of the first device is watching the broadcast programme on the second device, the comparing step being enabled in dependence thereon.

6. The method of claim 5, wherein the determining that the user of the first device is watching the broadcast programme on the second device comprises one or more of:
collecting a locked status of one of both of the first device and the second device;
collecting a screen interaction status of one of both of the first device and the second device;
collecting a motion activity status of one of both of the first device and the second device;
collecting a screen power status of one of both of the first device and the second device;
collecting a processor unit state of one of both of the first device and the second device;
collecting a battery drain status of one of both of the first device and the second device; and
collecting active application states of one of both of the first device and the second device.

7. The method of claim 1, further comprising:
storing a usage pattern and time stamps of one of both of the first device and the second device;
aligning historical usage pattern data based on similar time frames;
normalizing current usage pattern data via aligned historical usage pattern data; and
utilizing the normalized pattern as the activity stream of the user in the comparing step.

8. The method of claim 1, further comprising:
restricting results of the comparing step to one or both of popular broadcast programmes and broadcast programmes for which the user has an affinity.

9. The method of claim 1, further comprising:
notifying the inferred broadcast programme to the user of the first device, and receiving notification as to whether the inference is correct.

10. A computer device comprising non-transitory storage media for storing computer program code which, when executed, performs the method of claim 1.

11. A server for associating activity on a first device to a broadcast programme broadcast on a second device, the first and second devices being different devices, the server comprising:
a receiver for receiving the broadcast programme broadcast on the second device;
a module for generating a model of the broadcast programme, the model identifying portions of content and portions of breaks in the content;
a second receiver for receiving an activity stream of the first device, the activity stream denoting one or both of the first device's active and inactive states;
a comparator for comparing the activity stream with the model and for identifying a correlation between the activity stream and the model; and
a module for inferring a user of the first device as watching the programme on the second device in dependence on the correlation.

12. The server of claim 11, wherein the model is a user behaviour model, the server further being configured to update the user behaviour model in dependence on the correlating the activity stream with the model.

13. The server of claim 11, wherein the server is configured to compare activity indicated in the activity stream with periods of content and periods of break in the model.

14. The server of claim 13, wherein the server is configured to infer from high activity during the break periods and minimal to no activity during the content periods that the user is watching the programme.

15. The server of claim 11, wherein the server is further configured to watch broadcast content, and enable a comparison in dependence on.

16. The server of claim 15, wherein the server is configured to determine if the user is watching the broadcast content in dependence on one or more of:
- collecting the device's locked status;
- collecting the device's screen interaction status;
- collecting the device's motion activity status;
- collecting the device's screen power status;
- collecting the device's processor unit state;
- collecting the device's batter drain status; and
- collecting the device's active application states.

17. The server of claim 11, further comprising:
a store for storing a usage pattern and time stamps of the first device, and configured to:
align historical usage pattern data based on similar time frames; normalize current usage pattern data via aligned historical usage pattern data; and utilize the normalized pattern as the activity stream of the user in the correlating the activity stream with the model.

18. The server of claim 11, further configured to restrict results of the correlating the activity stream with the model to one or both of popular broadcast programmes and broadcast programmes for which the user has an affinity.

19. The server of claim 11, further configured to notify the user of the first device as to the inferred programme, and to receive notification as to whether the inference is correct.

20. A method for associating activity on a first device to a broadcast programme broadcast on a second device, the first and second devices being different devices, the method comprising:
receiving the broadcast programme broadcast on the second device;
generating a model of the broadcast programme, the model identifying portions of content and portions of breaks in the content;
receiving an activity stream of the first device, the activity stream denoting one or both of an active state of the first device and an inactive state of the first device;
comparing the activity stream with the model, and identifying a correlation between the activity stream and the model; and
inferring a user of the first device as watching the programme on the second device in dependence on the correlation.

* * * * *